Aug. 8, 1939.　　　　O. G. BENNETT　　　　2,168,509
AMPOULE SEALING APPARATUS
Filed Aug. 6, 1937　　　2 Sheets-Sheet 1
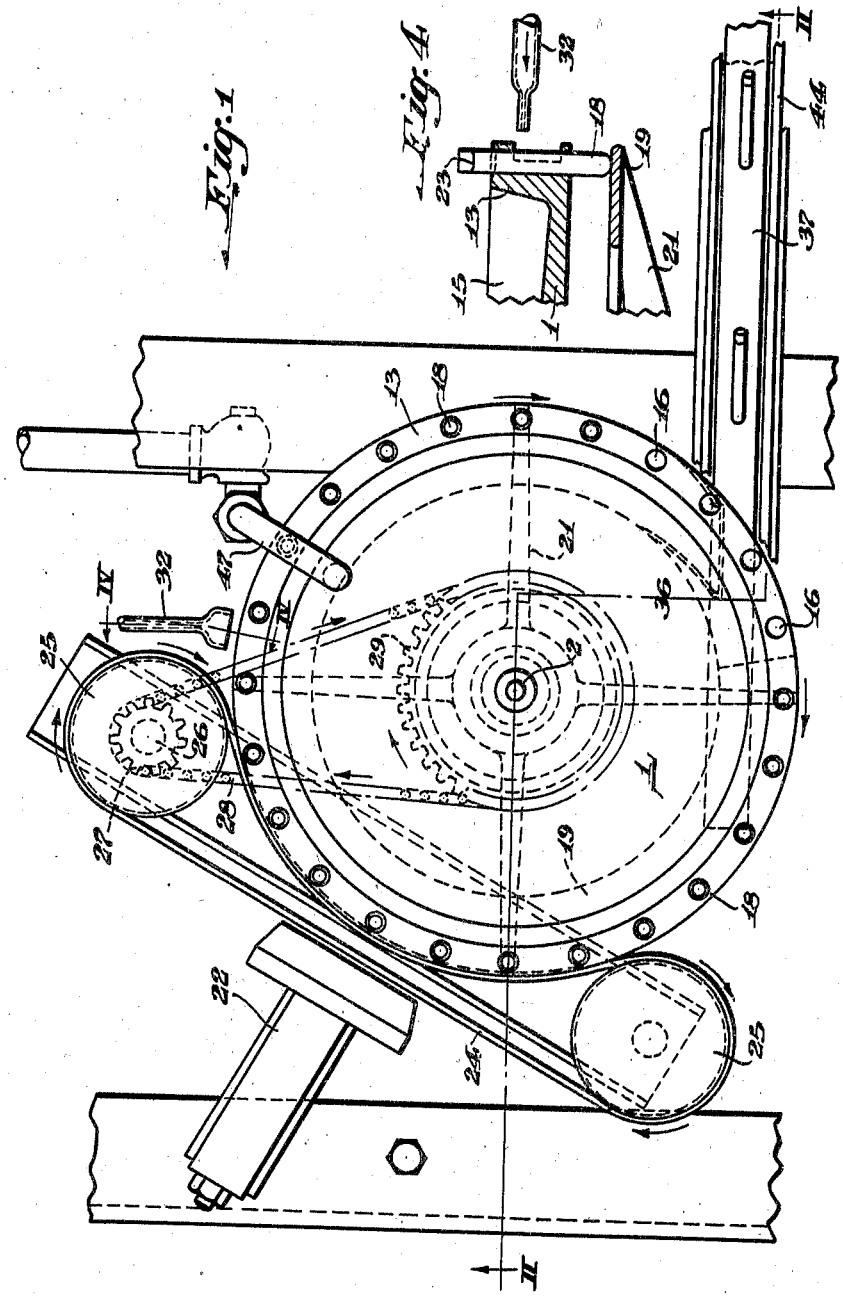
WITNESSES:
E. J. Malouky
E. O. Johns
INVENTOR.
Owen G. Bennett
BY Brown, Critchlow & Flick
his ATTORNEYS.

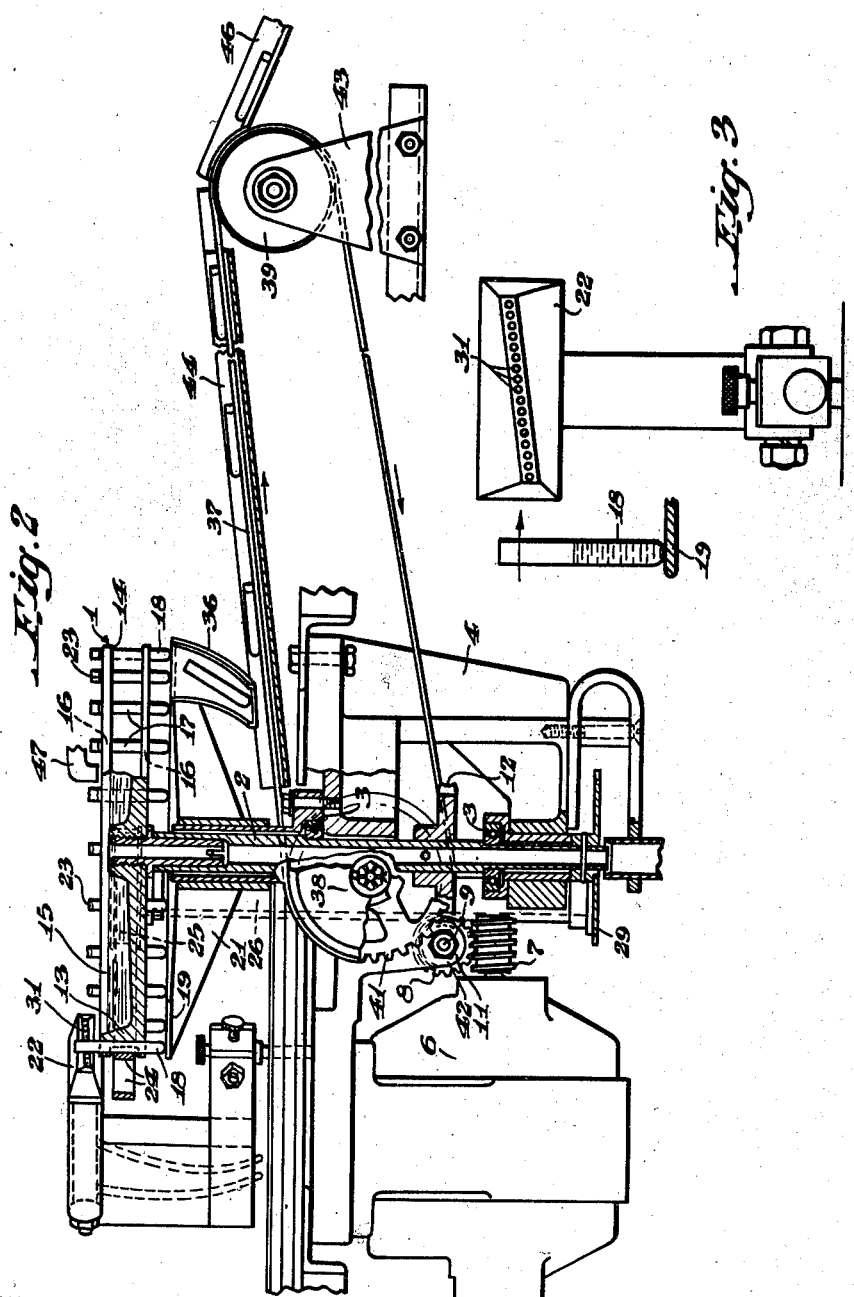

Patented Aug. 8, 1939

2,168,509

UNITED STATES PATENT OFFICE 2,168,509

AMPOULE SEALING APPARATUS

Owen G. Bennett, Pittsburgh, Pa., assignor to Catalyst Research Corporation, Pittsburgh, Pa., a corporation of Maryland Application August 6, 1937, Serial No. 157,646

7 Claims. (Cl. 226—80)

This invention relates to apparatus for sealing the open upper ends of ampoules containing iodine, ammonia or any other medicament or the like.

According to present-day methods of manufacturing such ampoules, small glass vials are partly filled with the desired liquid and then their upper ends are sealed by a worker who holds them for a moment in a gas flame. Thereafter the sealed ampoules are placed on end with their newly sealed ends uppermost so that the cool liquid therein will not crack the hot seals. As the sealing operation is performed by hand, it is a rather slow operation, and it is difficult to always form the seal of substantially the same thickness as the adjoining portion of the ampoule, wherefore it is likely to crack in cooling.

It is an object of this invention to provide apparatus for automatically sealing ampoules. Another object is to provide means for sealing ampoules more rapidly and with less breakage than heretofore.

In accordance with this invention means is provided for conveying substantilaly upright ampoules laterally in succession through a flame or other source of heat which melts their open upper ends and thereby seals them. As the ampoules pass through the flame they are rotated so as to subject all sides to the heat, and as they leave the flame air is preferably blown against them to cool and contract the air therein sufficiently to cause the molten seal to be drawn inwardly and thinned out. Preferably, the flame is relatively wide and is inclined relative to the path of movement of the ampoules so that it first strikes them below their upper ends to vaporize and expel moisture from their inner surfaces above the liquid therein, and then engages and melts the upper ends of the ampoules. Because of this release of vapor before sealing is attempted, vapor is not formed during sealing which would be likely to blow out and break the hot plastic seals. The sealed ampoules are delivered to a conveyor that is inclined enough to prevent the cool liquid contents of the ampoules from coming in contact with the seals before they have cooled.

The preferred embodiment of the invention is illustrated in the accompanying drawings in which Fig. 1 is a plan view of my ampoule-sealing apparatus; Fig. 2 is a reduced vertical section thereof taken substantially on the line II—II of Fig. 1; Fig. 3 is an enlarged end view of the torch; and Fig. 4 is an enlarged section taken on the line IV—IV of Fig. 1.

Referring to Figs. 1 and 2 of the drawings, a substantially horizontal wheel 1 is mounted on the upper end of a vertical shaft 2 journaled in vertically spaced bearings 3 carried by a suitable support 4. The wheel is rotated by means of a motor 6 having on its drive shaft a worm 7 that meshes with a worm gear 8 rigidly mounted on a horizontal shaft 9 carrying a worm 11 that drives a worm gear 12 secured to wheel shaft 2 (Fig. 2). The wheel is provided with an upstanding peripheral flange or rim 13 having a peripheral groove 14 therein and forming a recess 15 in the top of the wheel. The upper and lower walls of this groove are provided at circumferentially spaced intervals with vertically aligned openings 16, connected by vertical recesses 17 in the back wall of the groove, for loosely receiving ampoules 18 in substantially upright position. To prevent the ampoules from dropping out of these openings, their lower ends are supported by a circular plate 19 carried by a spider 21 encircling shaft 2 below the wheel.

As the ampoules are carried laterally in a circular path by the rotating wheel, their open upper ends are heated and sealed by the flame from a torch 22 adjustably mounted at one side of the wheel in a position for directing its flame inwardly over the rim of the wheel so that it strikes the exposed upper ends of the ampoules. It is a feature of this invention that as the ampoules pass through the flame they are rotated rather rapidly on their longitudinal axes so that each ampoule is heated on all sides to form a uniform seal 23. A traveling endless belt 24 is preferably used for this purpose, and is trained around horizontally spaced grooved rollers 25 mounted on the upper ends of vertical shafts 26 journaled in a suitable support (Fig. 1). One of these shafts is driven through a sprocket 27 on its lower end by a chain 28 and a sprocket 29 secured to the lower end of wheel shaft 2. Belt 24 is preferably flat and is made of a material, such as rubber, that can frictionally engage and rotate the ampoules without injuring them. As shown in Fig. 1, the outer strand of the belt extends in a straight line between the rollers, but there is enough slack in the belt so that the inner strand is caused by the exposed central portions of the ampoules in wheel groove 14 to take an arcuate path whereby several ampoules are engaged by the belt at the same time. In this way each ampoule starts to rotate before it reaches the flame and continues its rotation until it is well past the flame.

Another feature of this invention is that any moisture that may be on the inner wall of an ampoule above the liquid level therein is vaporized and expelled therefrom before the seal is formed. Because of this the hot plastic seal is not broken by vapor escaping from the ampoule while the seal is being formed. To accomplish this highly desirable result the head of the torch is relatively wide with its end provided with a series of perforations or jets 31 extending in a line that is inclined relative to the plane of the wheel, as shown in Fig. 3. The lower end of this line is at the side of the torch first approached by unsealed ampoules, and the torch is so positioned vertically that its thin wide flame first strikes each ampoule at a point somewhat below its upper end in order to vaporize and expel moisture from the inner wall thereof before sealing occurs. As the ampoule travels through the flame, the latter gradually rises to the upper end of the ampoule which it then seals.

Still another feature of this invention is that as each ampoule leaves the flame with its upper end sealed thereby it is subjected to a blast or stream of cool air that cools and contracts the air therein and thereby draws the hot plastic seal inwardly to thin it out. Due to this thinning of the seal, cracking is avoided as it cools because the seal becomes substantially as thin as the adjoining portion of the ampoule. This cooling air is preferably directly against the ampoules by means of a nozzle-ended tube 32 connected to a suitable source of air under pressure and positioned to direct air against the exposed portions of the ampoule in the wheel groove. It is best that the air strike the ampoules above the liquid therein, as shown in Fig. 4. At a point substantially opposite to the torch, supporting plate 19 is provided with an opening having a downwardly inclined bottom that forms a chute 36. As the sealed ampoules reach this opening in the plate they slip out of wheel openings 16 and slide down the chute. It is another feature of this invention that until the seals have cooled to the point where they will not break when the cool liquid contents of the ampoules strike them, the ampoules are maintained in a position in which their contents cannot engage the seals. Accordingly, the inclined chute may be made long enough to permit the seals to cool before leaving it, or, as shown in Fig. 2, the chute may deliver the sealed ampoules onto an inclined conveyor the inclination of which is sufficient for the above-mentioned purpose. A suitable conveyor comprises an endless belt 37 traveling in a vertical plane around pulleys 38 and 39 one of which is mounted below the wheel and spider and is driven by a gear 41 meshing with a pinion 42 on horizontal shaft 9. The other pulley is journaled in a bracket 43 mounted on a suitable support. The upper strand of the belt which receives and carries away the ampoules is supported by an inclined channel 44 having side flanges that prevent the ampoules from rolling off the belt. This belt delivers the ampoules to a chute 46 down which they slide to any convenient receptacle in which they may be taken away for inspection and packing.

It is also desirable to provide means for cooling wheel 1 to prevent the torch from overheating it. This is preferably done by water introduced into its recessed top through a pipe 47 connected to a suitable water supply. To draw off the water that has absorbed heat from the wheel and thereby permit continuous flow of water through the wheel, vertical wheel shaft 2 is preferably hollow with its upper end projecting above the bottom of recess 15, as shown in Fig. 2. A body of water is therefore maintained in the wheel, but cannot overflow it because of the drain formed by the hollow shaft.

To summarize the operation of the apparatus disclosed herein, partly filled ampoules are inserted in openings 16 in rotating wheel 1 and are carried thereby laterally in an arcuate path through the wide thin flame produced by torch 22. The lower side of the flame first strikes each ampoule and expels moisture from the inner surface thereof above the liquid level. As the flame rises to the upper end of the ampoule it fuses the glass and forms a seal. While the seal is still plastic the ampoule is carried through a stream of cool air that cools and contracts the air in the ampoule and thereby draws the seal inwardly to thin it out so that it will not crack in cooling. When the sealed ampoule reaches a point substantially opposite to the torch it slips out of the wheel openings and slides down chute 36 to the inclined conveyor on which it is transported to any desired point.

It will thus be seen that after a partly filled ampoule is inserted in the rotating wheel it is automatically sealed and is not touched again until the seal has cooled and has been delivered to a suitable receptacle. Consequently, ampoules can be sealed much more rapidly and with considerably less labor than heretofore. Also, there is little danger of breakage because the seals, which are formed after moisture has been expelled from the ampoule, are drawn thin like the body of the ampoules and are not touched by the liquid contents until they are substantially cool.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:

1. Ampoule sealing apparatus comprising a wheel rotatable in a substantially horizontal plane and provided near its periphery with a plurality of vertical openings adapted to receive and carry ampoules having open upper ends, and a torch mounted adjacent the wheel and adapted to direct a flame over one edge of the wheel to seal the upper ends of said ampoules, the top of the wheel being recessed, and means for flowing water through said recessed top to maintain the wheel cool.

2. Ampoule sealing apparatus comprising a wheel rotatable by a substantially vertical hollow shaft, the rim of the wheel being provided with a plurality of circumferentially-spaced openings for receiving and carrying ampoules having open upper ends, a torch mounted adjacent the wheel and adapted to direct a flame inwardly over said rim to seal the upper ends of the ampoules, said rim extending upwardly above the body of the wheel and the top of said hollow shaft, and a tube for supplying water to the wheel within the rim to maintain it cool, said water draining away from the wheel through said hollow shaft.

3. Ampoule sealing apparatus comprising a wheel rotatable on a substantially vertical axis and provided in its periphery with an annular groove the upper and lower walls of which are provided with vertically aligned openings for receiving ampoules, a plate disposed below said wheel for supporting said ampoules, a torch disposed adjacent said wheel for directing a flame inwardly across the upper edge thereof to heat and seal the open upper ends of the ampoules projecting above the wheel, said torch being formed for producing a thin wide flame inclined relative to the wheel whereby to first engage said ampoules below their upper ends and then rise to said upper ends as the ampoules pass through the flame, an endless belt traveling in a substantially horizontal plane adjacent said wheel and engaging the exposed portions of the ampoules in said groove as they pass through the flame to thereby rotate them, a nozzle for directing a stream of air on said exposed portions as the ampoules leave the flame, said plate being provided with an opening through which sealed ampoules slip from the wheel, inclined means for receiving said sealed ampoules and carrying them away from the wheel, and means for cooling said wheel.

4. Ampoule sealing apparatus comprising heating means, carrier means for carrying ampoules past said heating means for heating and sealing their open ends, said carrier means being formed with a recess for the reception of a cooling liquid, said recess being provided with an outlet, and means for continuously delivering said liquid to said recess.

5. Ampoule sealing apparatus comprising heating means, carrier means traveling in a substantially horizontal plane for carrying ampoules past said heating means to heat and seal their open ends, said carrier means being provided in its top with a recess having a floor and side wall, said floor having a portion extending upwardly provided with a drain opening therethrough, the upper end of said opening being disposed below the top of said side wall, and means for delivering a liquid into said recess for cooling said carrier means.

6. Ampoule sealing apparatus comprising a wheel rotatable in a substantially horizontal plane and adapted to carry ampoules having open upper ends, means adapted to heat said upper ends to seal them, the top of the wheel being recessed, and means for flowing cooling liquid through said recessed top to maintain the wheel cool.

7. Ampoule sealing apparatus comprising a rotatable wheel having an upwardly extending side wall, a substantially vertical hollow shaft projecting through the wheel to a point below the top of the side wall, said wheel being formed for carrying ampoules, means for heating the open ends of the ampoules to seal them, and a tube for supplying a liquid to the wheel within its side wall to maintain it cool, said liquid draining away from the wheel through said hollow shaft.

OWEN G. BENNETT.